(Model.)
G. M. WALDORF.
SPRING HINGE.
No. 389,865. Patented Sept. 18, 1888.
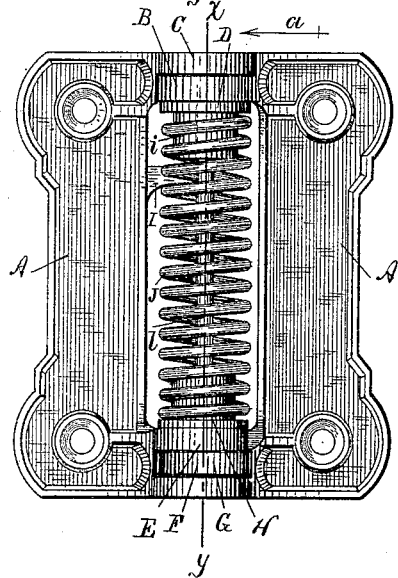
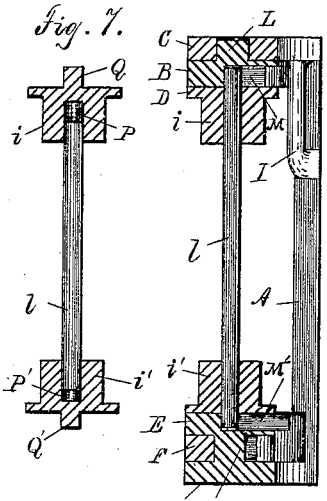
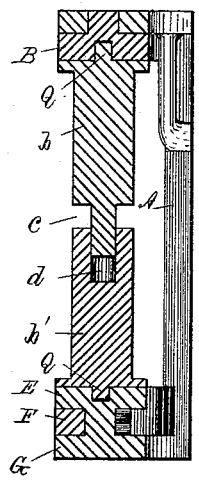
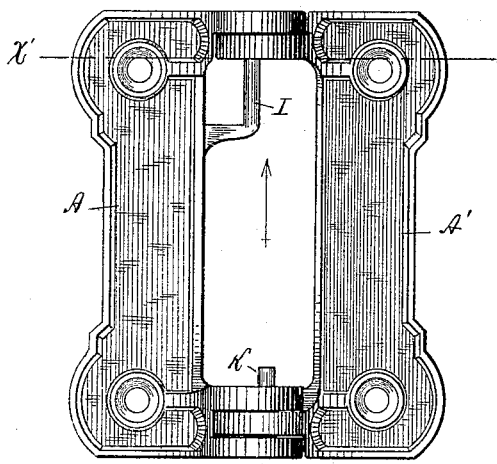
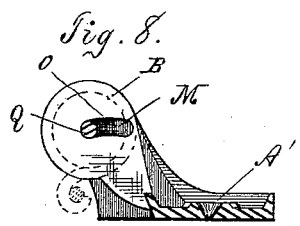
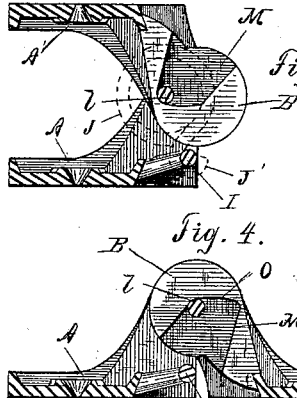
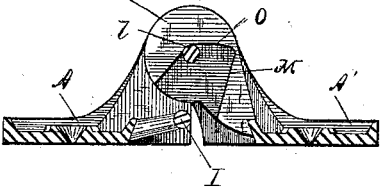
WITNESSES:
Geo. H. Pattison
F. W. Brainard
INVENTOR
George M. Waldorf

UNITED STATES PATENT OFFICE.

GEORGE M. WALDORF, OF FREEPORT, ILLINOIS, ASSIGNOR TO ROBERT H. WILES, OF SAME PLACE.

SPRING-HINGE.

SPECIFICATION forming part of Letters Patent No. 389,865, dated September 18, 1888.

Application filed December 21, 1885. Serial No. 186,257. (Model.)

*To all whom it may concern:*

Be it known that I, GEORGE M. WALDORF, a resident of Freeport, in the county of Stephenson and State of Illinois, have invented certain new and useful Improvements in Spring-Hinges; and I do hereby declare the following to be a full, clear, and exact description of the invention, such as will enable others skilled in the art to which it pertains to make and use the same.

My invention relates to improvements in spring-hinges, and is fully described and explained in the following specification and shown in the accompanying drawings, in which—

Figure 1 is a plan of a completed hinge; Fig. 2, a plan of the leaves without the spring; Fig. 3, a central vertical section of the leaves and spring-supporting centers and pintle; Fig. 4, a cross-section of the leaves through the line $x'\ y'$, Fig. 2, looking in the direction indicated by the arrow in Fig. 2; Fig. 5, a similar view with the leaves fully opened; Fig. 6, a central vertical section of a different form from that shown in Fig. 3; Fig. 7, a central longitudinal section of a spring-center to be substituted for that shown in Fig. 6; Fig. 8, an internal end view of a leaf slightly different from that shown in Figs. 4 and 5.

In the views, A A' are the leaves of a surface-hinge, the leaf A' having two ears, B F, and the leaf A having three ears, C E G. The ear B has a short pintle, $l$, which enters a socket in the ear C, and the ear F lies between the ears E G, and is slotted below to receive a pintle, N, which connects the ears E G. This arrangement of the ears is not essential, though it is a convenient form, since it makes the hinge right or left hand. The only essential feature of the arrangement of the ears is, that the two innermost ears, E B, shall be one fastened to one of the leaves and the other to the other leaf, since the spring-supporting devices must engage with ears fastened to both leaves, as is hereinafter explained. On the leaf A, and at one end thereof, is formed integrally a loop or rod, I, and at the opposite end of the other leaf is an integrally-formed pin, K. The form of these rods or pins is not essential; but it is convenient to make one of them a pin instead of a closed loop, in order to connect the spring more readily.

In the inner face of each of the ears B E is formed a recess, M, Fig. 8, whose inner end is a circle concentric with the ear, (or with the axis of the hinge-joint,) while the body of the recess extends from the center of the ear outward toward the body of the leaf on which the recess is formed, and preferably in a general direction nearly parallel to the base of the leaf. The upper face, O, of the recess is the working surface thereof, and the form of the lower surface is unimportant. It may, in fact, be cut away entirely, leaving the upper surface of the recess and the ends thereof in the same positions shown in Fig. 8, but removing the metal from the bottom of the recess to the bottom of the ear, thus forming the open recess M. (Shown in Figs. 4 and 5.)

Between the ears B E, and preferably in line therewith, is a coiled spring, J, Figs. 1 and 5, provided at its ends with hooks J', which engage the pins I K. In the ends of the coil are flanged buttons or centers, adapted to hold it in place, and from the centers of these buttons project pins or lugs, which engage with the surfaces O of the recesses M. These supporting-buttons may be of different forms; but they all operate in substantially the same way. Fig. 3 shows a form which may be used with the open recesses M. (Shown in Figs. 4 and 5.) In this form a single pintle, $l$, extends through both the buttons $i\ i'$ and into the two recesses M, the ends of the pintle being in contact with the surfaces O of the recesses. Figs. 6 and 7 show two forms which may be used with the recess M. (Shown in Fig. 8.) In the form shown in Fig. 6, the buttons or centers $b\ b'$ have gudgeons Q formed on their outer ends, and these gudgeons enter the recess M, and the inner end of one of the buttons is provided with a socket, $d$, and the inner end of the other with a pin, $e$, which enters the socket $d$. By means of this arrangement the two buttons may be pressed together sufficiently to permit the admission of the gudgeons Q to the recess M. In the form shown in Fig. 7 the same result is attained by forming gudgeons Q on the outer faces and sockets P in the inner faces of the two buttons $i\ i'$, and connecting the two buttons by a pintle, $l$, of such length as to permit the pressing together of the two buttons.

In all these forms the operation is the same. The central projections on the outer ends of the buttons enter the recesses M of the two ears B E, while the hooks on the ends of the spring engage the pins I K; and since the hook at either end of the spring presses inward against the pin which it engages, the central projection of the corresponding button is pressed outward in a direction opposite to the direction in which the hook presses against the pin. Thus, in Fig. 8, the hook J' presses inward on the pin I and the gudgeon Q is pressed in the opposite direction and lies at the inner end of the slot M—that is, at the center of the circular ear B. The same thing is true of Fig. 4. The hook of the spring must press inward against the pin I, and press the pintle $l$ against the inner end of the surface O. In other words, as long as the hinge is closed, the projections at the centers of the buttons will remain at the centers of the ears B E; and it is evident that if the leaf A' be rotated from the position shown in Fig. 4 toward the position shown in Fig. 5 the pintle $l$ will maintain its position at the center of the ear B until the surface O of the recess M reaches such a position as to allow the pintle to slide from its inner toward its outer end. So long as the pintle remains at the center the spring will exert a constantly-increasing closing force on the hinge. When the pintle begins to slide along the surface O, away from the center, the closing force will diminish or disappear, and when the leaf A' reaches the position shown in Fig. 5 and the pintle reaches the outer end of the face O the hinge will be held open.

It is evident that the forms shown may be variously modified without altering the principle of operation of the hinge; but I have indicated what I consider the most satisfactory forms.

Having now described and explained my invention, what I claim as new, and desire to secure by Letters Patent, is—

1. In a spring-hinge, the combination, with two leaves of suitable form having ears connected to form hinge-joints, of a coiled spring hooked at its opposite ends to said leaves, and pins projecting from the ends of the coil and entering recesses in said ears, the working faces of said recesses being cams adapted to permit the shifting of said pins with reference to the axis of the hinge, substantially as and for the purpose set forth.

2. The combination of the leaves A A', having pins I K, and ears B E, having recesses M, the spring J, having hooks J', engaging the pins I K, and the buttons $i\ i'$, having central projections entering the grooves M, substantially as shown and described.

3. The combination of the spring J, having hooks J', the buttons $i\ i'$, having gudgeons Q and sockets P, and the pintle $l$, entering the sockets P, substantially as shown and described.

In testimony whereof I have signed this specification in the presence of two subscribing witnesses.

GEORGE M. WALDORF.

Witnesses:
F. W. BRAINERD,
J. A. CRAIN.